United States Patent [19]
Ouellet

[11] Patent Number: 5,126,584
[45] Date of Patent: Jun. 30, 1992

[54] WINDMILL

[76] Inventor: Gilles Ouellet, 2565 des Cormiers, Fleurimont, Quebec, Canada, J1G 4S1

[21] Appl. No.: 697,014

[22] Filed: May 8, 1991

[30] Foreign Application Priority Data

Jun. 4, 1990 [CA] Canada .................. 2018199

[51] Int. Cl.⁵ .............................. F03D 7/00
[52] U.S. Cl. ..................... 290/55; 290/44; 415/4.2; 415/4.4; 415/907; 416/13
[58] Field of Search ...... 290/44, 55; 415/2.1, 415/4.1, 4.2, 4.4, 160, 161, 905, 907; 416/12, 13, 14

[56] References Cited

U.S. PATENT DOCUMENTS

| 43,663 | 8/1864 | Barton | 415/907 |
|---|---|---|---|
| 591,775 | 10/1897 | Peterson | 416/13 |
| 918,864 | 4/1909 | Pope | 415/4.1 |
| 1,365,371 | 1/1921 | Camet | 415/2.1 |
| 2,812,823 | 6/1952 | de Oviedo | 415/4.1 |
| 4,047,834 | 12/1977 | Magoveny et al. | 290/55 |
| 4,115,027 | 9/1978 | Thomas | 290/55 |
| 4,415,814 | 11/1983 | Parra | 290/55 |
| 4,486,143 | 12/1984 | McVey | 415/4.4 |
| 4,551,631 | 11/1985 | Trigilio | 290/55 |

FOREIGN PATENT DOCUMENTS

| 515879 | 4/1921 | France . |
|---|---|---|
| 593840 | 9/1925 | France . |
| 1111673 | 3/1956 | France . |

OTHER PUBLICATIONS

Popular Science, "Spinning Sail", — The What's New Magazine, Jan. 1984.

Primary Examiner—A. D. Pellinen
Assistant Examiner—Robert Lloyd Hoover
Attorney, Agent, or Firm—ROBIC

[57] ABSTRACT

A windmill having a stator and a rotor. The rotor has the shape of a long convex blade having sharp edges and being symmetrical with respect to its longitudinal axis. The stator which surrounds and supports the rotor comprises a lower platform which acts as a base, an upper platform parallel to the lower platform and a set of vertical and also equally spaced vanes joining the two platforms. According to a first embodiment, each vane is formed of an outer stationary shutter joining the two platforms and of a movable inner shutter capable of pivoting about its longitudinal axis. In an other embodiment, the vanes are one-piece element and can pivot freely on posts of which the ends are secured to the two platforms. In either case, there is provided a control mechanism responsible for the angular orientation of the movable shutters or vanes.

13 Claims, 8 Drawing Sheets

AIR FLOW

INDUCED AIR FLOW

WIND DIRECTION

WINDMILL

BACKGROUND OF THE INVENTION

1. Field of the Invention

The present invention relates to a windmill adapted to drive an electric power generator, particularly but not exclusively.

2. Description of the Prior Art

French Patent Nos.:

515,879
593,840
1,111,673

U.S. Pat. Nos.

918,364
1,365,371
4,047,834
4,415,814
4,486,143
4,551,631

If, for instance, one compares the Dutch mill and the fast twin-bladed screw, both of which operate on the helix concept, one observes that the aerodynamic efficiency of the mill is of about 18% whereas that of the twin-bladed screw is of about 45%. The reason is that the latter is the result of a refined aerodynamic design whereas it is practically nil in the mill conception.

In these patents, it is also noted that all rotors are, without exception, wheels that operate on the drag force principle; these machines being considered as having a small aerodynamic efficiency not exceeding 20% and having features that make them inadequate for producing electricity.

It is notable also that all these machines apply, in one form or the other, the funnel principle. The Applicant has experimented with this principle and, according to him, no power can be derived from such a construction as the pressure at the inlet, that is in the part that has the largest diameter, is the same in that at the inlet of the turbine, that is the part that has the smallest diameter. The same thing applies to the outlet funnel, although the flow of air at that location takes place in reverse.

Furthermore, the control and adjustment systems in the machines described in U.S. Pat. Nos. 4,415,814 and 4,551,631 are provided with shutters located between the stator and the rotor. In operation, the shutters that are parallel to the direction of the wind are closed and those perpendicular to the direction of the wind are open which results in forming a funnel at the inlet of the turbine and an other one at the oulet; they must be handled each time the wind changes direction. To resume, these machines are dependent on the direction of the wind and the addition of a series of shutters increases their bulkiness and decreases their efficiency.

As concerns U.S. Pat. No. 1,365,371, it describes a machine intended to propel a boat or an aircraft rather than a windmill. It is to be noted also that one of the faces of the vane is convex whereas the other is concave.

The other patents only have a remote interest as regards the present invention.

SUMMARY OF THE INVENTION

A first object of the invention lies in providing a windmill having a rotor and a stator of which the transverse cross section of the rotor as well as that of the stator is aerodynamic in order to improve its efficiency.

Another object resides in that the windmill according to the invention is of the lift type of which the efficiency may reach 45%, by contrast to those of the patents mentioned above which are of the drag type that have an efficiency not exceeding 20%, as said above.

An additional object is to provide a windmill which is not dependent upon the direction of the wind and counts on the presence of shutters between the stator and the rotor, as is the case for example in U.S. Pat. Nos. 4,415,814 and 4,551,631, as previously said.

Finally, the windmill according to the invention may use of a rotor having bulging or convex faces; a shape that determines that the windmill is of the lift type rather than of the drag type.

More specifically, and according to the foregoing, the windmill of the invention comprises:

a lower and an upper platform:

a rotor consisting of a single long bulging blade with sharp opposing edges, the blade being symmetrical with respect to a longitudinal axis thereof;

means mounting the blade on the platforms, in free rotation around the longitudinal axis; and a set of identical elongated vanes having an aerodynamic profile, the names being equally spaced around a common circle coaxial with the rotor longitudinal axis and mounted, at their ends, on the platforms to form therewith a stator, the vanes being oriented at an equal angle with respect to the diameter of the circle in order to optimize the thrust on the rotor and cause rotation thereof.

According to a particular and preferred embodiment, the windmill is characterized in that:

each of the vanes comprises an outer shutter having a leading edge and is fixed, at its ends, to the lower and upper platforms; and an inner shutter, having a trailing edge; the inner shutter being mounted so that it may pivot between an active position, in which it is aligned with said outer shutter and forms with it the aerodynamic profile, and an inactive position in which it stands at an angle with respect to the outer shutter.

According to another embodiment, the windmill is characterized in that:

these platforms are interconnected by cylindrical posts spaced at equal angles from one another along a common circle coaxial with the longitudinal axis of the rotor and of which the ends are secured to these platforms;

these vanes are mounted free to pivot each on one of the posts; and control means are provided allowing the vanes to be pivoted simultaneously and through equal angles.

A description is now given hereinafter of these preferred embodiments with reference to the appended drawings. These embodiments are however only indicative of the invention and do not restrict it.

COMPLETE DESCRIPTION OF THE PREFERRED EMBODIMENTS

Referring to FIGS. 1 to 5, the vertical windmill 1 is seen to be made up of a stator 3 and of a rotor 5. The stator comprises a lower platform 7 which acts as a base; an upper platform 9 and a set of eight identical vertical vanes 11 connecting them, each vane being formed of an outer stationary shutter 13 and an inner movable shutter 15. A mechanism 17, or control means, is responsible for the angular orientation of the inner movable shutters 15.

Figures 5, 7:
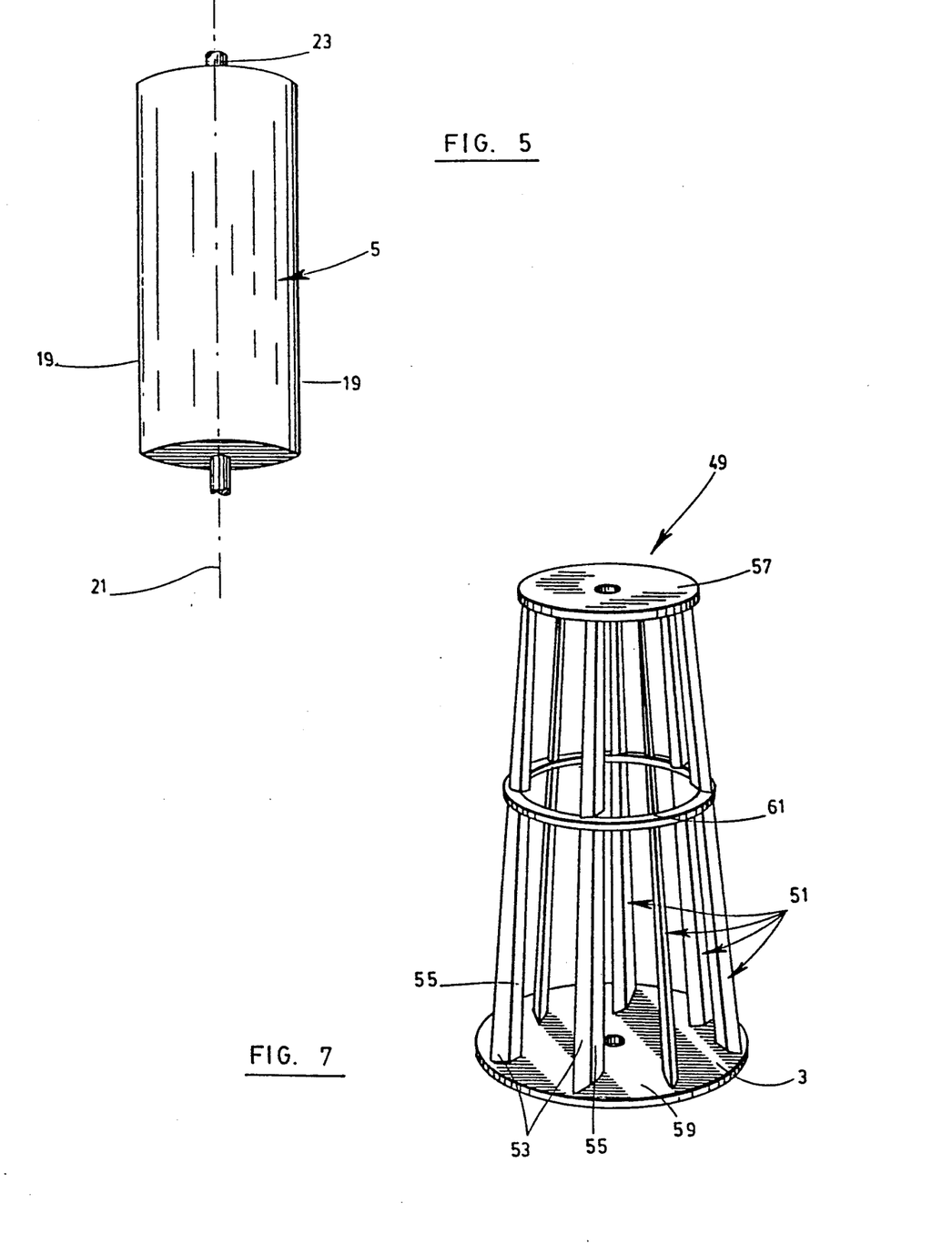
FIG. 5 is a perspective view of the blade of the rotor.
FIG. 7 is a perspective view of one type of a stator.

The rotor 5 has the shape of a long solid bulging "or convex" blade having a sharp double edge 19; it is symmetrical with respect to a central plane extending along its longitudinal axis 21 as is clearly seen in FIG. 5. It is mounted for pivotal movement on the platforms 7, 9 by means of a shaft 23 of which the end spindles rotate freely in a thrust bearing 25 of the base 7, on the one hand (FIG. 1), and a shaft bearing 27 of the platform 9, on the other hand; the two bearings being of conventional antifriction construction.

The rotor is entirely free to rotate, as the wind goes, around its longitudinal axis 21. It is further connected to a not shown electric power generator by means of any known coupling arrangement symbolized here simply by a gear 29 at its lower end. The rotor operates in a manner similar to that of an airplane wing of which the leading angle would vary constantly.

On the other hand, the eight vanes 11 of the stator 3 are elongated members having an aerodynamic profile and are equally spaced along a common circle coaxial with the axis 21 of the rotor. In position of full power, as in FIG. 3, the stator vanes 13 are turned at an angle of 45° with respect to the diameter of the circle in order to optimize the thrust on the rotor so as to cause its rotation, as is explained further hereinafter in connection with the description of FIG. 6.

In this particular embodiment, the other shutters 13 are fixed, at their ends, so as to become solid with the platforms 7 and 9 and complete the stator. On the other hand, the inner shutters are secured to shafts 31 of which the inner ends rotate in bearings of the platforms 7 and 9 much in the same manner as the ends of the shaft 23 of the rotor 5.

It will be noted that the leading edge 33 of each outer shutter is rounded and that the trailing edge of each inner shutter 15 is sharp. In position of full power, the shutters 13 and 15 are locked in alignment along oblique surfaces 37 and 39. In this manner, and by means of a control mechanism described hereinafter, it is possible to pivot the inner shutters simultaneously and at equal angles between an active position of the windmill, where the shutters fall in line and take on the aerodynamic profile of an airplane wing (FIG. 3), and an inactive position of the windmill where the inner shutters cross the path of the outer shutters (FIG. 4).

The control mechanism previously mentioned comprises pinions 41 (FIG. 2) secured to the upper ends of the shaft 31; meshing with an inwardly toothed crown wheel 43 and being capable of rotating in supports 45 provided with antifriction bearings. The crown and the pinions are brought into rotation, manually or mechanically by another pinion 47 mounted on the upper platform 9. This is a conventional mechanism which is obviously not inventive.

Figure 3:
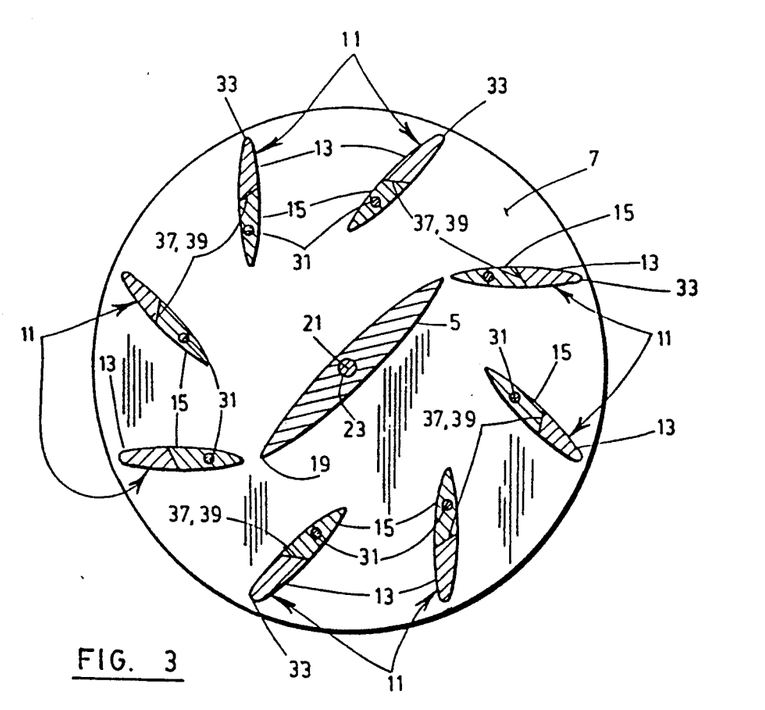
FIG. 3 is a transverse cross-sectional view according to line III—III in FIG. 1; the stator vanes being in operating position.
Figure 4:
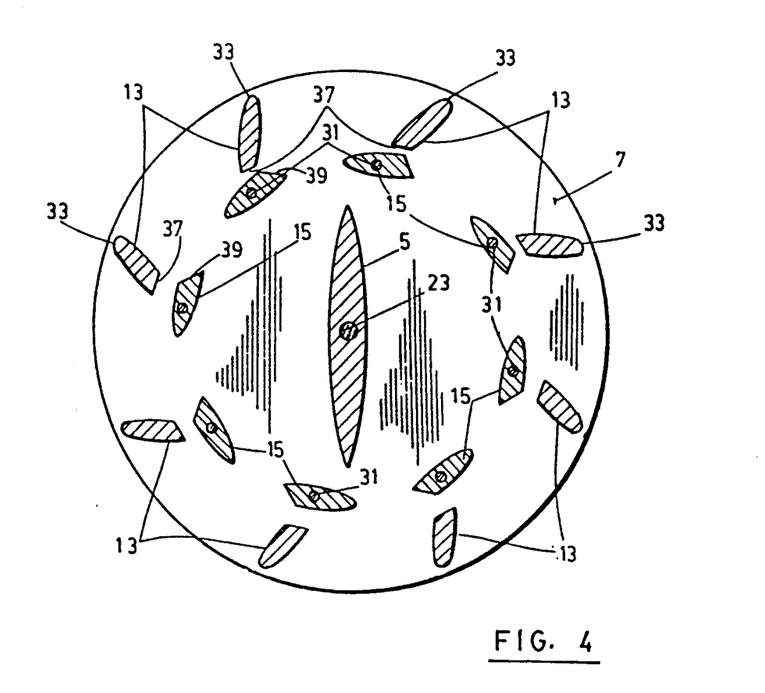
FIG. 4 is a view similar to that of FIG. 3 but with the stator vanes being in inactive position.

The orientation of the vanes 11, in FIG. 3, at 45° with respect to the diameter of the circle of the said vanes, makes it possible to adjust to the airflow inside the windmill so as to draw the maximum of power from the apparatus. Here, all the vanes are being used. This shape is essentially the same all around the rotor and it remains so whatever be the direction of the wind, considering that the stator is totally symmetrical. In FIG. 4, where the windmill is at rest, this shape is changed and the airflow inside decreases considerably.

Figure 6:
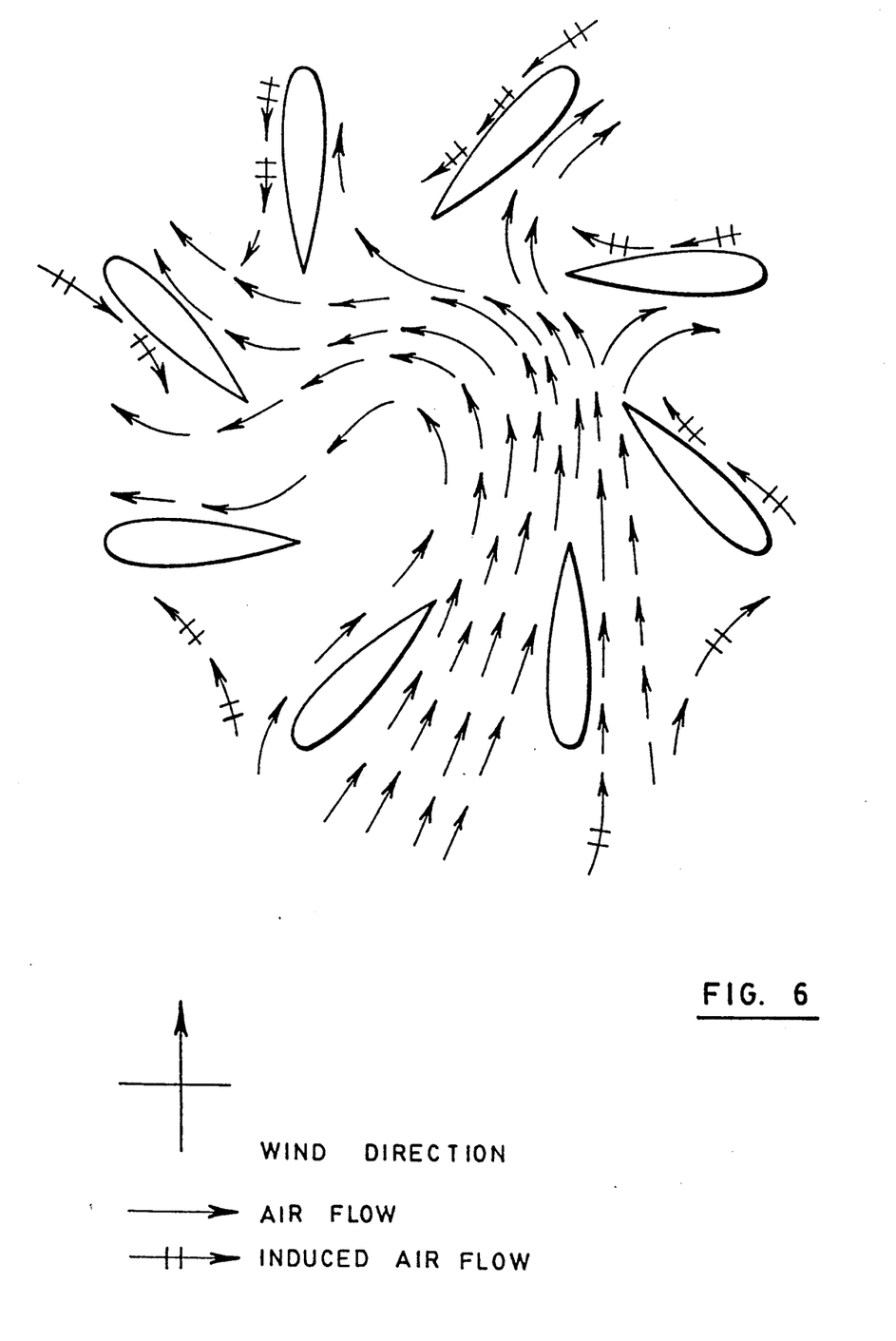
FIG. 6 is a diagram illustrating the configuration of the flow of air within the windmill.

If reference is now made to the diagram of FIG. 6, illustrating the configuration of the flow of air within the windmill (which is a graphical representation of the air currents circulating in the space comprised between the vanes 11; representation obtained by the method called the wool strand (a method wherein a strand of wool is allowed to float around or inside an object subjected to the action of the wind), it may be noted that the combined action of the vanes 11 of the stator and of the wind creates a whirling movement over about ¾ of the space in which the rotor 5 moves. This makes it possible to conclude that the rotor 5 is acted upon simultaneously on both sides and over ¾ of its course.

FIG. 7 illustrates the stator 49 of a windmill of the type described above wherein the vanes 51 are each made up of a fixed shutter 53 and of a movable shutter 55. In the latter, the vanes are uniformly inclined toward the rotor in the direction of the upper platform 57 so that the stator has the shape of a truncated cone. Besides, the fixed shutters 53 are made solid with one another by a bracing ring 61 between the platforms 57 and 59. The inclination of the fixed truncated shutters 53, in a large size installation, makes it possible to allow for the increase in wind speed due to elevation and to thus hold constant the force of the wind acting on the rotor axis.

Figure 1:
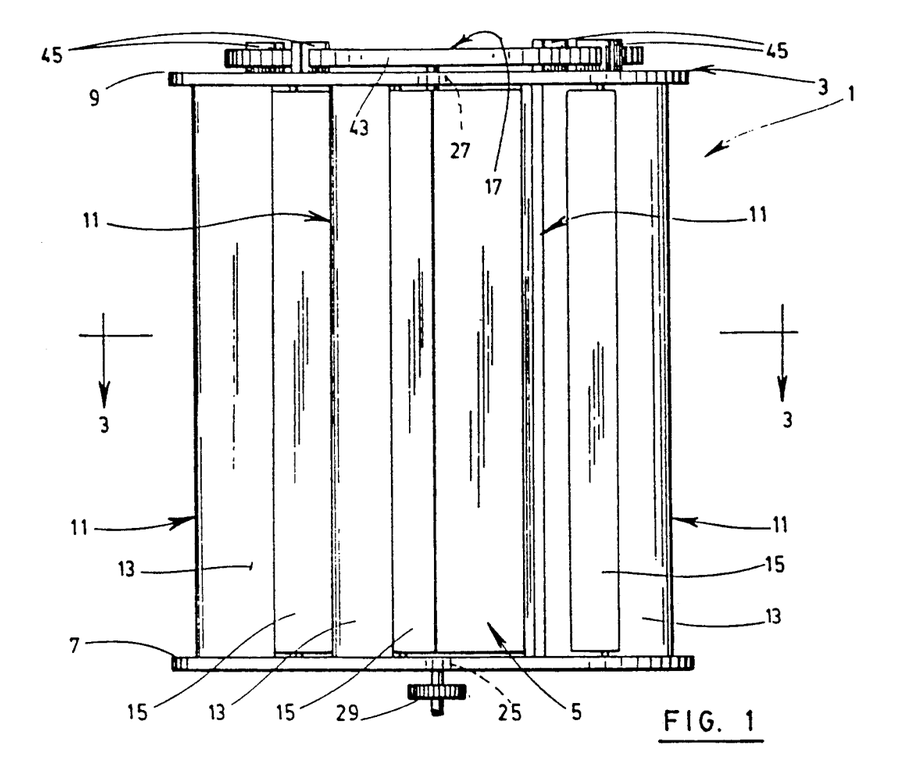
FIG. 1 is a view in elevation of a windmill according to a first embodiment.
Figure 2:
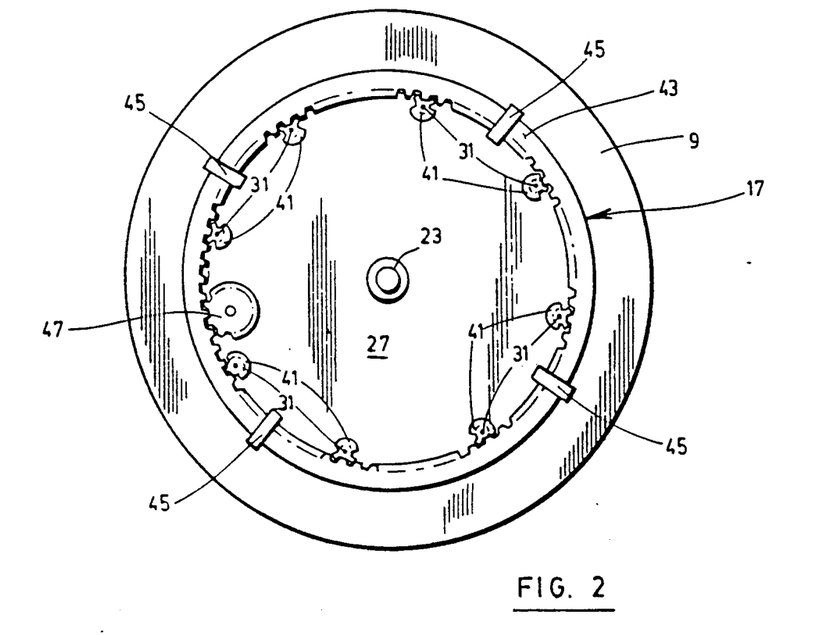
FIG. 2 is a plane view from above.
Figure 8:
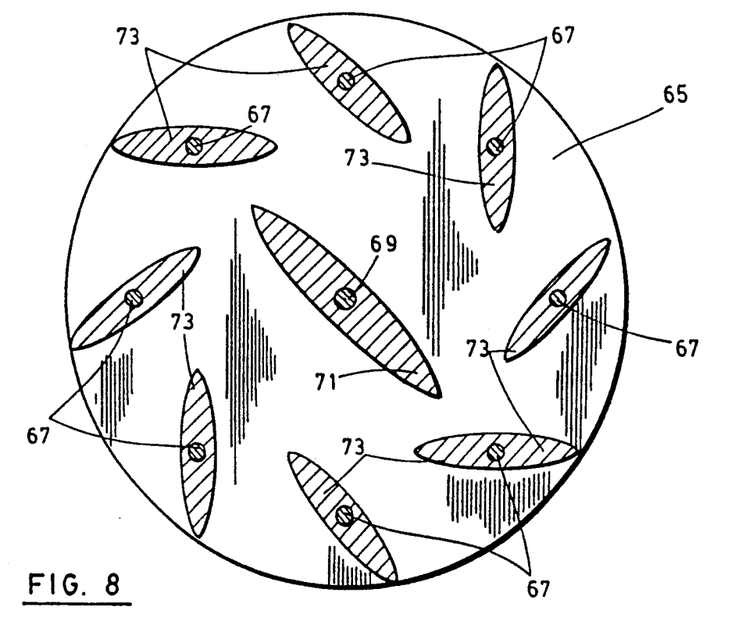
FIG. 8 is a view in transverse cross section similar to that in FIG. 3, but according to another embodiment of the invention.
Figure 9:
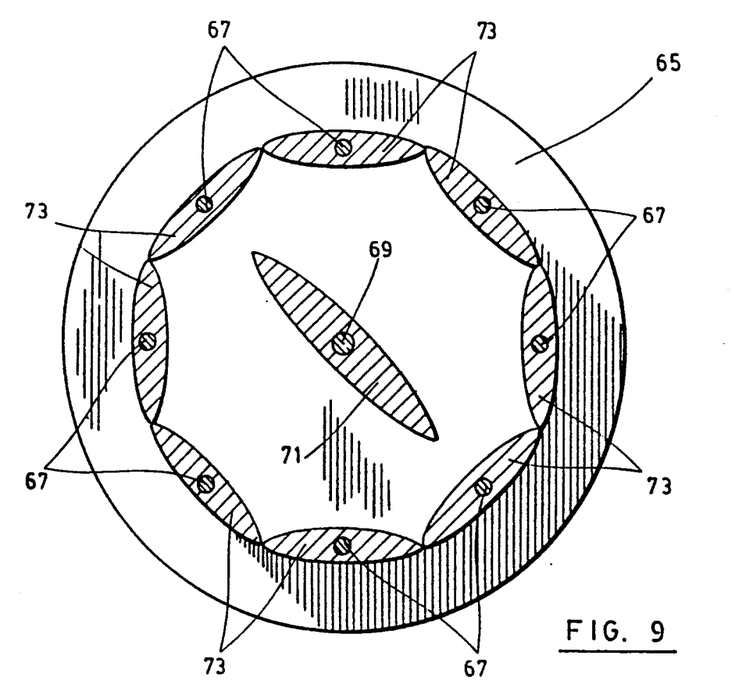
FIG. 9 is a transverse cross-sectional view of this second embodiment in closed or inactive position of the windmill.
Figure 10:
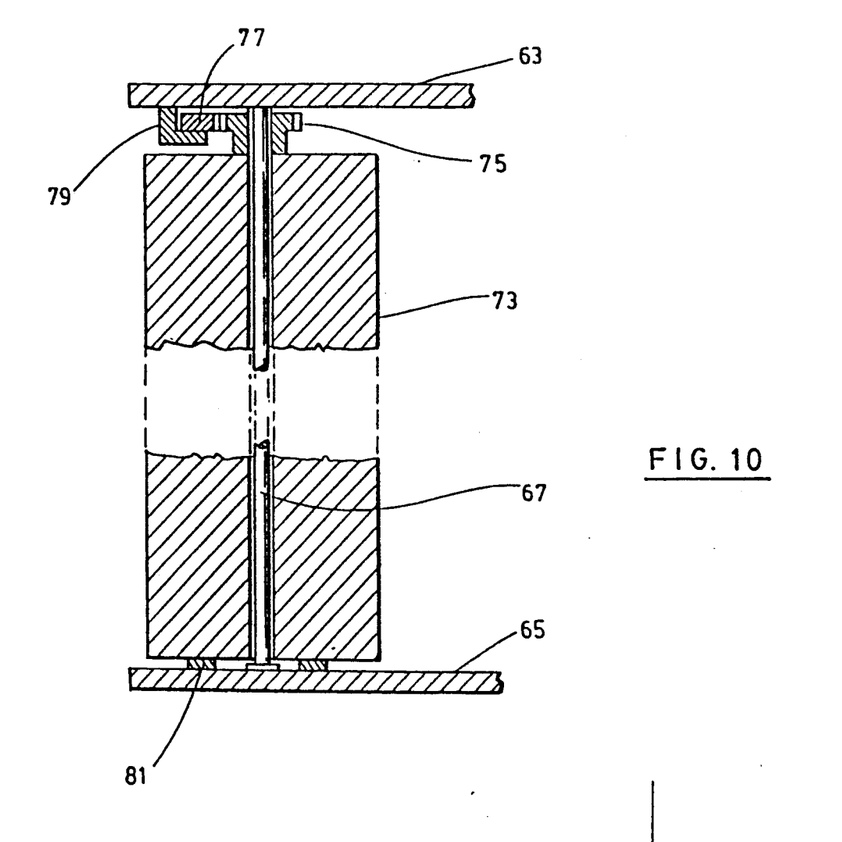
FIG. 10 is a partial view in vertical cross section of one side only of the windmill of FIGS. 8 and 9.

FIGS. 8, 9 and 10 illustrate, as has been said previously, a second embodiment of the invention. In the latter, the platforms 63 and 65 are connected together by cylindrical posts 67, the ends of the latter being secured to the posts. These posts are spaced angularly equally along a common circle coaxial to the longitudinal axis 69 of the rotor 71. The vanes 73 here are in one piece and are mounted free to pivot on the posts 67. They are made to pivot by means of a mechanism, similar to the one shown in FIG. 2, illustrated in FIG. 10. This mechanism takes on the form of L-shaped pinions 75 of which the vertical legs rotate around the posts 67 and are secured at the ends of the vanes 73. The horizontal legs of the pinions are toothed and meshed with an inwardly toothed crown 77 held in a support 79 fixed beneath the upper platforms 63. An additional pinion (not shown), similar to the control pinion 47 in FIG. 2, also meshes with the crown 77 and allows, whenever actuated by any appropriate means, to control the degree of pivoting of the vanes 73, simultaneously. The latter vanes are born by antifriction pillow-blocks 81 provided on the lower platform 65.

It will be noted here that each vane 73 is a long convex blade having sharp edges and that it is symmetrical with respect to a central plane extending along its longitudinal axis. It therefore has the same shape as the rotor 71.

Figure 11:
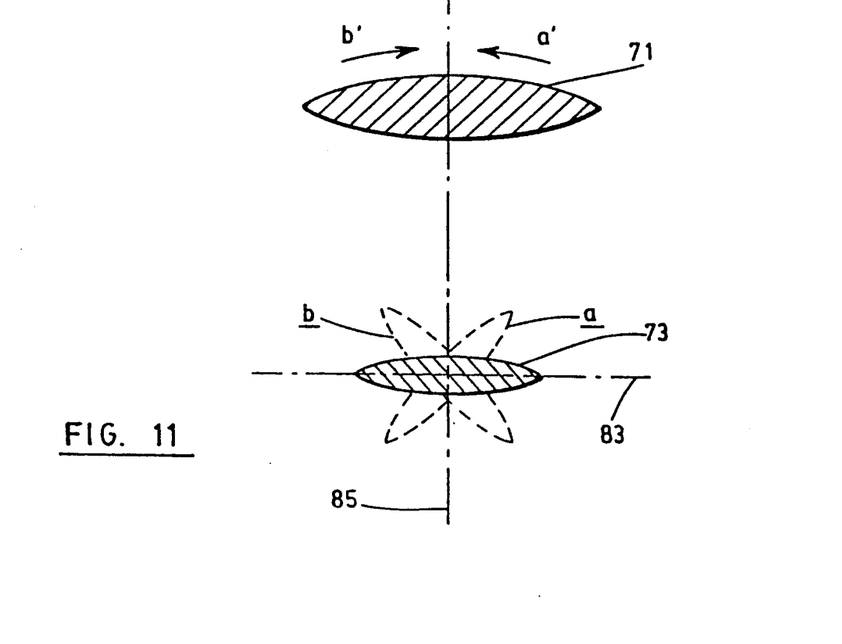
FIG. 11 is an operating diagram of the windmill according to the second embodiment.

In the present case, there are no longer any vanes (11) with fixed shutters (13) supporting platforms (7) and (9) and any movable shutters (15) controlling the orientation of the wind but fixed posts 67 holding the plates 63 and 65 together and around which solid vanes 73 can pivot. The working is similar in the two embodiments except that the movable vanes 73 in the second embodiment are able to pivot by 90° which allows it to reverse the direction of rotation of the rotor 71 as illustrated in the diagram of FIG. 11. If the vanes 73 are turned counterclockwise around axis 85 and relative to axis 83, as at a, the rotor will turn counterclockwise according to arrow a'; if they are turned clockwise as at b, the rotor will turn clockwise as shown by arrow b'.

In this second embodiment and by giving the vanes 73 an appropriate length, they can constitute a circular enclosure, as shown in FIG. 9, which prevents any air from circulating inside when the windmill is at rest.

If the angles corresponding to positions a and b are 45°, from the horizontal axis 83 then the rotor 71 will rotate at maximum power. If, on the other hand, the vanes 73 are progressively moved toward the horizontal axis 83, the power will likewise progressively decrease until the rotor 71 be practically stopped. It will be remembered from what has been said previously that the vanes are synchronized by the control mechanism and that they make the same angle with respect to the diameter of the circle along which they lie.

Figure 12:
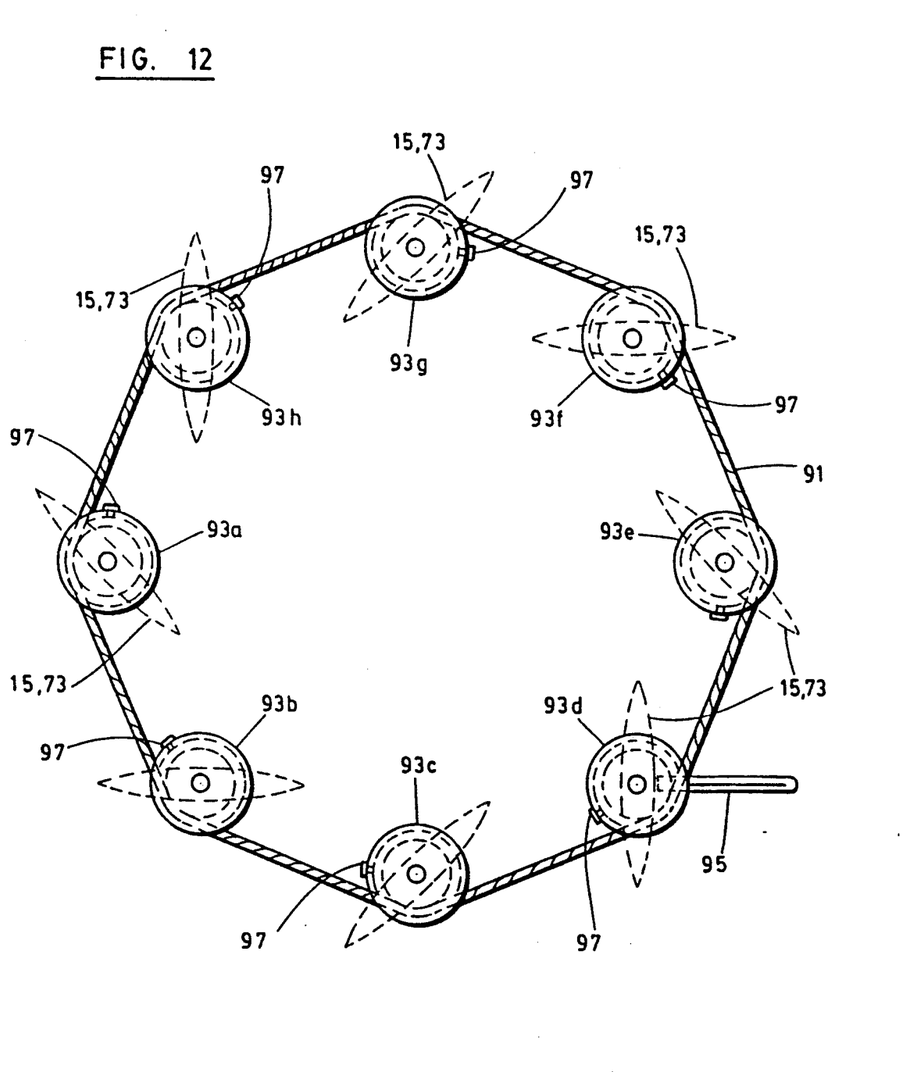
FIG. 12 is a plane view of another control system capable of being applied to the two embodiments of FIGS. 1 and 8.
Figure 13:
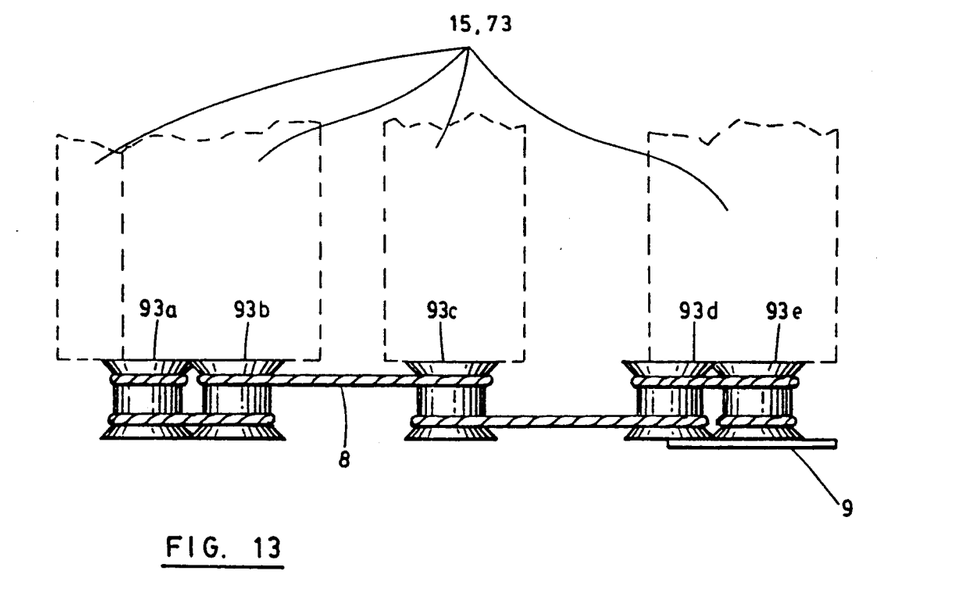
FIG. 13 and 14 being front and rear views, respectively.
Figure 14:
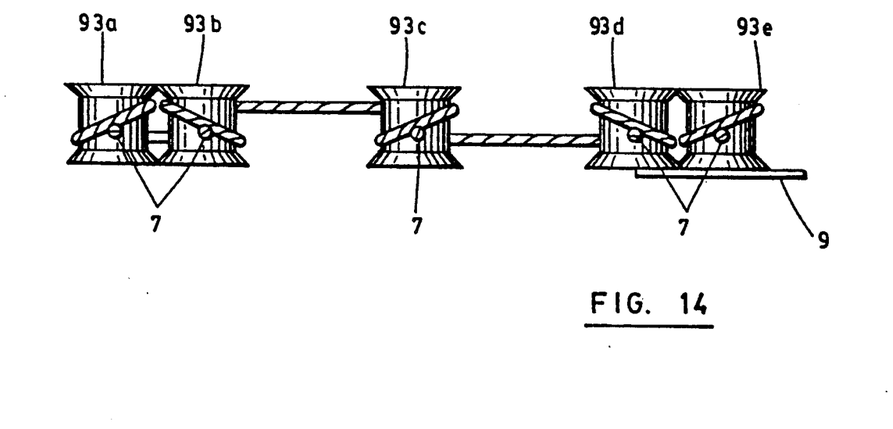

FIGS. 12, 13 and 14 propose, as an alternative, another control system applicable to either one of the two embodiments described above. According to this system, a control cable 91, preferably a steel cable, operatively joins a set of pulleys 93 a to h secured to the bottom of the inner movable shutters 15, in the first embodiment of FIG. 3, or to the bottom of the movable vanes 73 in the second embodiment of FIG. 8, in the extensions of their respective pivot shafts 31, 67, through the platforms 7, 65 for instance. As can be gathered from a study of FIGS. 12, 14 and 14 the cable 93 winds by the top around a pulley 93a, comes out by the bottom to then wind by the bottom around the next pulley 93b, as FIG. 14 clearly partly illustrates, and thus up until all of the pulley are interconnected to two ends of the cable being joined to form an endless cable. A control lever 95 is secured beneath one of the pulleys and clamping screws 97 allow first an accurate adjustment of the angle of each shutter 15 or vane 73 to thereby obtain a better efficiency of the windmill and, second, to prevent the cable 91 from sliding on the pulleys 93.

Finally, the Applicant believes that the windmill described above qualifies as a motor for propelling a boat. Indeed, it operates without taking the wind direction into account. Controlling the power is obtained by throttling, meaning that it is only necessary to change the angle of the stator vanes. When the latter are closed, as in FIG. 9, the windmill offers very little grip to the wind as it becomes a sort of round tower completely isolating the rotor. As has been seen, it is easy to reverse the direction of rotation of the rotor, therefore of the drive shaft, which is a great advantage when manoeuvring. Finally, the windmill has a full-proof stability since it is supported by eight posts.

This windmill, if mounted on a boat, would allow to pick-up the energie of the wind even when anchored or moored either to reload the batteries or to provide the electricity necessary for the life on board.

However, there is no intention here to restrict the invention for its use on a boat. Nevertheless, besides the fact that it may serve to pump water or to produce electricity, the windmill according to the invention and as claimed herein may propel a boat or a ground vehicle.

The embodiments of the invention in which an exclusive property or privelege is claimed are defined as follows:

1. A windmill comprising:
   a lower and an upper platform;
   a rotor consisting of a single long bulging blade with sharp opposing edges, said blade being symmetrical with respect to a longitudinal axis thereof;
   means for mounting said blade between said platforms, in free rotation about said longitudinal axis; and
   a set of identical elongated vanes having an aerodynamic profile, said vanes being equally spaced around a common circle coaxial with said rotor longitudinal axis and having opposite ends mounted on said platforms to form therewith a stator, said vanes being oriented at an equal angle with respect to the diameter of said circle in order to optimize the thrust on the rotor and cause rotation thereof.

2. A windmill according to claim 1, wherein said vane orientation angle is 45°.

3. A windmill according to claim 1, comprising means for coupling said rotor to an electric power generator.

4. A windmill according to claim 1, wherein:
   said platforms are interconnected by cylindrical posts spaced at equal angles from one another along a common circuit coaxial with said longitudinal axis of said rotor, said posts having ends secured to said platforms;
   said vanes are mounted free to pivot each on one of said posts; and
   control means are provided for allowing said vanes to be pivoted simultaneously and through equal angles.

5. A windmill according to claim 4, wherein each vane has the shape of a long bulging blade having sharp edges; each vane blade being symmetrical with respect to a central plane extending along its longitudinal axis.

6. A windmill according to claim 4, comprising means for coupling said rotor to an electric power generator.

7. A windmill comprising:
   a lower and an upper platform;
   a rotor consisting of a single long bulging blade with sharp opposing edges, said blade being symmetrically with respect to a longitudinal axis thereof;
   means for mounting said blade between said platforms, in free rotation about said longitudinal axis; and a set of identical elongated vanes having an aerodynamic profile, said vanes being equally spaced around a common circle coaxial with said rotor longitudinal axis and having opposite end mounted on said platforms to form therewith a stator, said vanes being oriented at an equal angle with respect to the diameter of said circle in order to optimize the thrust on the rotor and cause rotation thereof, wherein:

each of said vanes comprises an outer shutter having a leading edge and ends fixed to said lower and upper platforms, and an inner shutter having a trailing edge; said inner shutter being mounted so that it may pivot between an active position, which it is aligned with said outer shutter and forms with it the said aerodynamic profile, and an inactive position in which it stands at an angle with respect to said outer shutter.

8. A windmill according to claim 7, comprising control means allowing said inner shutters to be pivoted simultaneously and through equal angles; said inner shutters having ends pivotally mounted on said platforms.

9. A windmill according to claim 8, wherein each vane orientation angle, in active position, is 45°.

10. A windmill according to claim 8, wherein in transverse cross section, said leading edge is rounded and said trailing edge is sharp.

11. A windmill according to claim 7, wherein, in transverse cross section, said leading edge is rounded and said trailing edge is sharp.

12. A windmill according to claim 7, wherein:
said vanes are uniformly inclined toward said rotor, in the direction of said upper platform, whereby to give said stator the shape of a frustocone.

13. A windmill according to claim 12, wherein said stator further comprises at least one bracing ring solidly connecting said outer shutters of said vanes, between said platforms.

* * * * *